United States Patent [19]
Schaeff

[11] Patent Number: 5,137,101
[45] Date of Patent: Aug. 11, 1992

[54] CROSS-COUNTRY VEHICLE WITH STEPWISE LOCOMOTION

[76] Inventor: Hans Schaeff, Haldenstrasse 26, D-7183 Langenburg, Fed. Rep. of Germany

[21] Appl. No.: 588,047

[22] Filed: Sep. 25, 1990

[30] Foreign Application Priority Data
Sep. 28, 1989 [JP] Japan .................................. 3932426
Nov. 8, 1989 [JP] Japan .................................. 3937161

[51] Int. Cl.⁵ .......................... B62D 57/02; E02F 9/04
[52] U.S. Cl. ..................................... 180/8.1; 180/8.3; 180/8.6; 414/694
[58] Field of Search ......................... 180/8.1, 8.3, 8.6; 414/694

[56] References Cited
U.S. PATENT DOCUMENTS

| | | | |
|---|---|---|---|
| 3,635,364 | 1/1972 | Tingleff | 414/694 |
| 4,395,191 | 7/1983 | Kaiser | 180/7.1 |
| 4,482,287 | 11/1984 | Menzi | 180/132 |
| 4,558,758 | 12/1985 | Littman et al. | 180/8.6 |
| 4,779,691 | 10/1988 | Werdner | 180/8.6 |
| 4,952,116 | 8/1990 | Weyer | 414/694 |
| 4,977,971 | 12/1990 | Crane, III et al. | 180/8.3 |

*Primary Examiner*—Mitchell J. Hill
*Attorney, Agent, or Firm*—Schlesinger Arkwright & Garvey

[57] ABSTRACT

A stepping vehicle with a chassis having two height-adjustable wheel arms with braked wheels and two stepping legs powered individually. The stepping legs are equipped with pivot limit positions parallel to the vehicle longitudinal axis and to assure chassis stability outside a stepping cycle, a support system is provided with one or two additional rest points.

11 Claims, 6 Drawing Sheets

CROSS-COUNTRY VEHICLE WITH STEPWISE LOCOMOTION

BACKGROUND OF THE INVENTION

The technical state of the art comprises stepping diggers as disclosed in the Swiss patent document 508,786 which are designed to move on terrains with extreme slopes and other irregularities. Their chassis comprise height and side adjustable wheel arms with wheels and further height and side adjustable support legs with resting claws. A superstructure pivotable about a vertical axis and mounted on the chassis supports the driver's cabin, the drive units and digging arm with digging buckets. By means of these and the two wheels, the vehicle when stepping rests on the ground while the support legs are lifted off the ground. By stretching and bending the digging arm, the stepping digger can be moved on its wheels. Once the digger has reached its final position, the chassis is deposited by its support legs on the ground and thereby the digger arm can initiate a new step.

In order to steer the stepping digger, the superstructure is constrained to rotate while the chassis is lifted on one side until the desired direction of travel has been reached. This procedure can be implemented only in small steps of a few degrees because the moment the tripod consisting of the two wheels and the digger arm has been altered to a point that the vehicle's center of gravity wanders outside the triangle, the vehicle shall tip over a claw or totally.

As soon as the bucket at the digger arm has been replaced by a freely hanging clamshell, the stepping process no longer is feasible because the clamshell does not transmit longitudinal or transverse forces. Other implements as well, for instance rock drills or wood reapers at the digger arm, do not permit stepping motions.

The U.S. Pat. No. 4,779,691 discloses a terrain vehicle which comprises a chassis similar to that of a stepping digger but lacks a digger arm pushing or pulling the vehicle, instead the two above described support legs are designed to be stepping legs which alternatingly support the vehicle on the ground by being the third resting point or are lifted off the ground. In the continuous motion with alternating use of the legs, a tripod is formed as for the stepping digger, said tripod being formed of two wheels and one leg. The lateral triangle lengths vary with each change of step and with each steering procedure. Accordingly the stability (reliability against tipping over) of the vehicle changes continuously and frequently is restricted to a narrow residual triangle, so that in the case of adverse loading and/or on a slope there will be danger of tipping over.

OBJECTS AND SUMMARY OF THE INVENTION

The object of the invention is to create a stepping vehicle for extreme terrains which with economical design allows being reliably and simply moved and steered but which does not require a digger arm for stepping and steering, whereby all variations are possible for fitting the superstructure. Illustratively the vehicle superstructure can be rotatable or be rigidly affixed to the undercarriage and it may comprise pallets, winches, add-ons, crane or digger arms, and moreover, even when a crane is being used, it shall be mobile, if necessary in translation.

The proposed design embodies a stepping vehicle applicable to arbitrarily difficult terrains, which is economical to manufacture and which can be handled comparatively easily like a conventional stepping digger, so that the driver need no more training than for a digger.

On the other hand there is danger of tipping over for the initially described stepping vehicle as soon as one of the stepping legs is raised and when just at this time there is present an adverse load distribution on account of the instantaneous position of the implement or because of difficult terrain. The invention is based on the consideration that for safety's sake it must be possible to directly support the chassis when, on difficult terrain, both stepping legs being driven simultaneously to improve stability in lieu of continuous motion with alternating use of the legs.

The side pivotability of the stepping legs is advantageously made use of to move along curves or to point the chassis in another direction. Steering is made easier for the driver in that a limit position parallel to the longitudinal vehicle axis is defined by stop means for the stepping legs. As a result a change in direction is made simpler, one stepping leg with supported chassis being pivoted into the steering direction and the other stepping leg into its end position, whereupon the chassis is raised and is moved into the new direction by simultaneously pivoting both legs, and further, following a change of direction, it is easier to resume the straightforward motion, for which purpose the two stepping legs are moved into their end positions.

The wheels held in pivotable manner at the rear wheel arms may be used alternatively to or simultaneously with the lateral pivoting motion of the stepping legs for the purpose of vehicle steering. A plug-on bracket mounted on the chassis may serve as a variation to the support of the chassis by a center heel or by two laterally lowered heels, said plug-on bracket receiving a center support, or else a braced pole, a winch or a wheel or a pair of wheels. The latter may be replaced by a track system, which is characterized by a larger resting surface. In addition to easier movement on plane terrain, steering the wheel or track moreover assures a heel or stop effect upon turning by 90° at least to one side in order to adequately support the stepping vehicle between the stepping cycles when on slopes.

Further features of the invention are stated in the claims, drawings and the description below of illustrative embodiments. These features whether considered alone or in combination may form further appropriate embodiments of the invention. Illustrative embodiments of the stepping vehicle of the invention are elucidated below in relation to the schematic drawings.

DESCRIPTION OF THE PREFERRED EMBODIMENTS

The shown stepping vehicle comprises a chassis 10 with, at one end, two height and side adjustable wheel arms 15 and ground wheels 20 resting in them, and, at the other end, two height and side adjustable stepping legs 25, 26 consisting in turn of upper and lower limbs 33 and 35 resp. and further of an omnidirectionally movable foot plate or claw 38.

Figure 5:
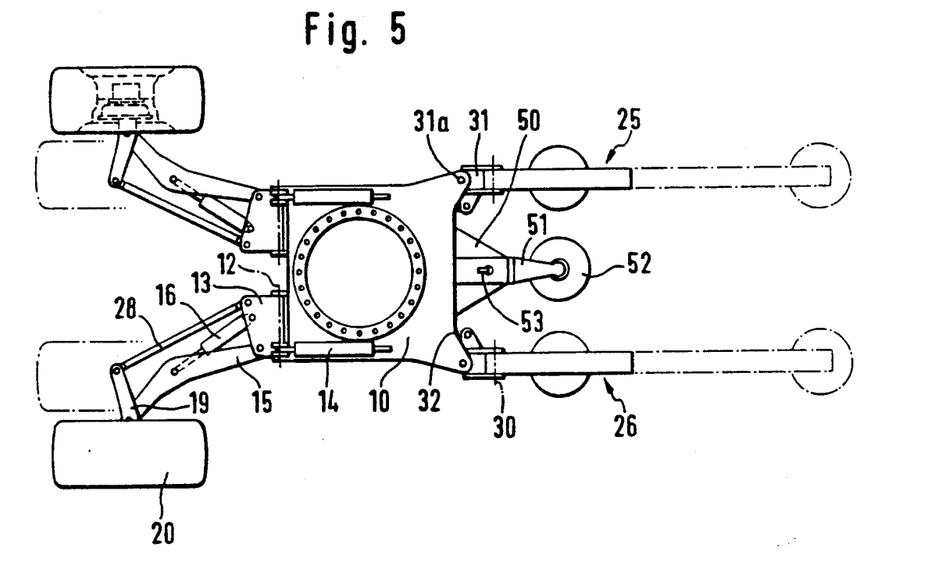
FIG. 5 is a topview of the undercarriage of the vehicle of FIG. 4.
Figure 6:
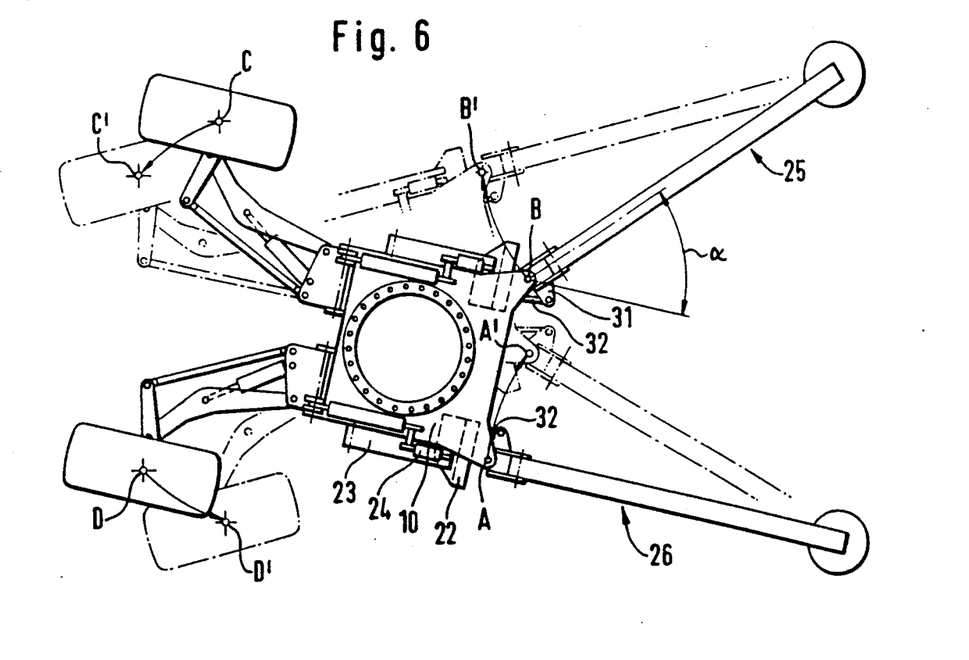
FIG. 6 is a topview of the undercarriage of the vehicle of FIGS. 1–3 illustrating one kind of steering using side-pivoting stepping legs.

The wheel arms 15 are supported by wheel arm hinges 13 in turn resting on horizontal hinge shafts 12 at the chassis 10 and pivoting in height by means of actuators such as hydraulic cylinders, 14 resting on the chassis. As shown by FIGS. 5 and 6, the ground wheels 20 each are guided by means of axle steering means 19 affixed to their hubs and by associated parallelogram steering mechanisms 28 to permanently remain parallel to the vehicle axis once they have been set to various track widths at the wheel arms 15 by means of the wheel arm actuators 16.

Figure 7:
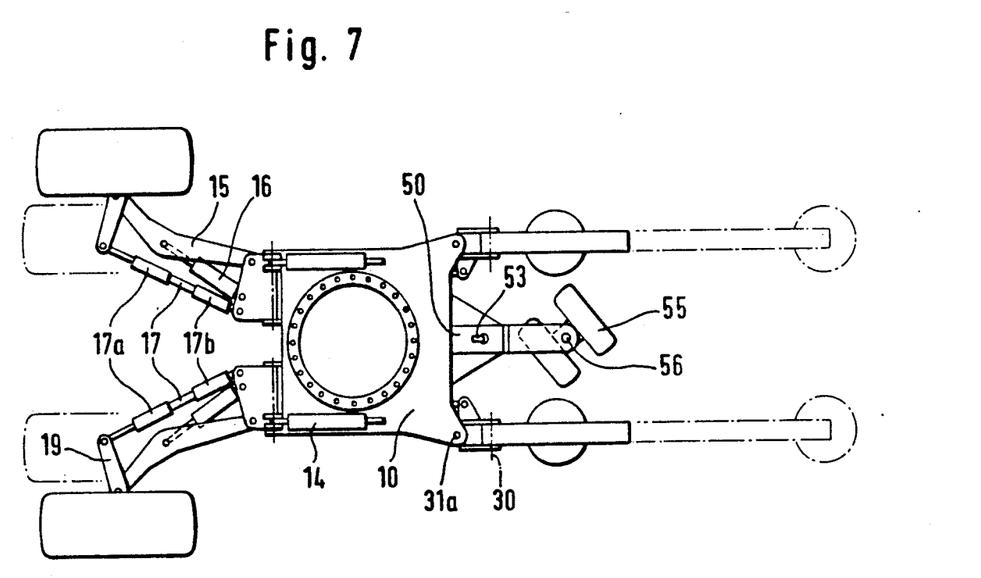
FIG. 7 is a topview as in FIG. 5 of variations of the support system and with steerable ground wheels.
Figure 9:
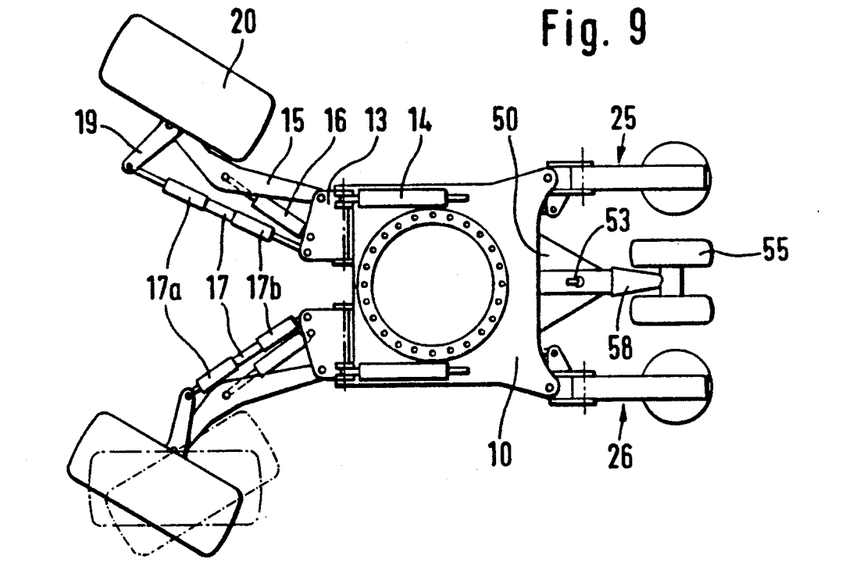
FIG. 9 is a topview of a vehicle with steered ground wheels as in FIG. 7 when in various steering positions.

In an alternative wheel steering system shown in FIGS. 7 and 9, the hubs of the ground wheels 20 are adjustable about vertical axes at the wheel arms 15. When the wheel arms 15 are approximately horizontal, wheel steering is possible by means of the wheel steering actuator 17a, 17b connected by a center segment 17 and acting on the axle guides 19. When as shown in FIG. 9 both actuators such as hydraulic cylinders 17a, 17b of one wheel are fully extended while those of the other wheel are retracted, then the wheels shall be at their maximum steering excursion. If as shown by FIG. 7 one wheel actuator 17a each is extended and one wheel actuator 17b each is retracted, then the ground wheels 20 remain parallel to the longitudinal vehicle axis regardless of the adjustment of the wheel arms 15.

As shown by FIGS. 1 through 3 and 6, two downward collapsing pivot arms 23 hinge laterally at the chassis 10 and can be adjusted in height using the actuators 24. They are part of a support system and, outside the stepping cycles, can be made to individually follow and match the terrain. The pivot arms 23 may bear heels or also braked wheels.

Figure 4:
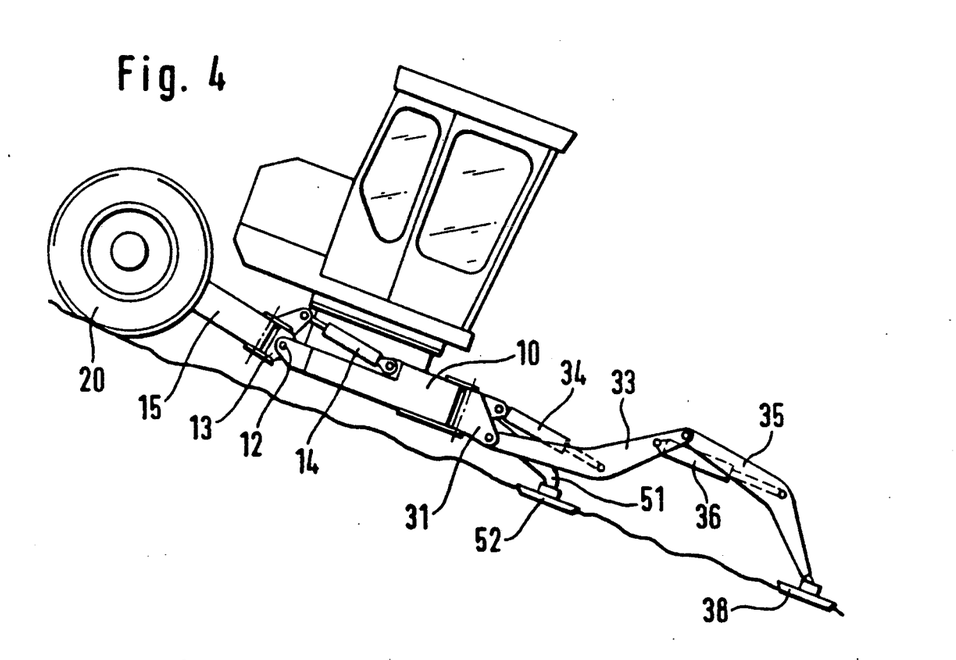
FIG. 4 is the same vehicle with fully extended stepping legs for which the side rests of the chassis are replaced by a central support plate.
Figure 8:
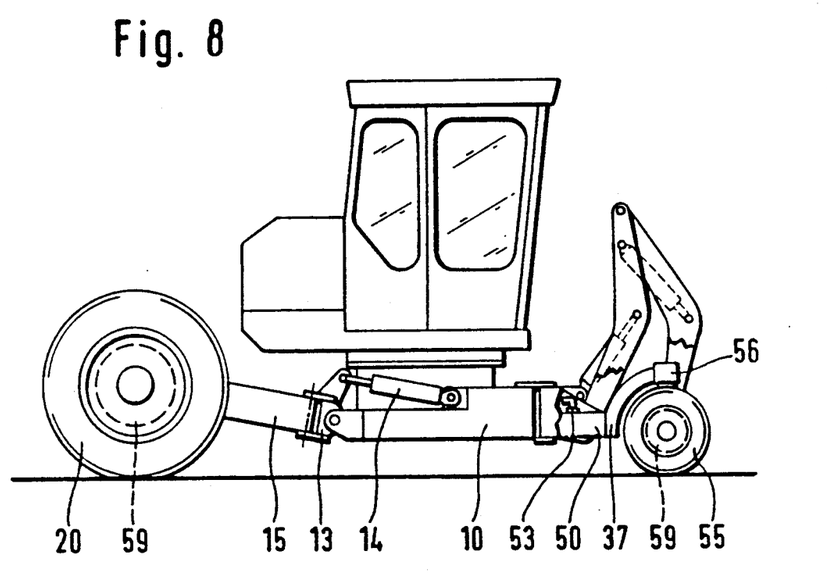
FIG. 8 is a sideview of the vehicle of FIG. 7 when ready for road travel.

As shown by FIGS. 4 and 5, the support system may be in the form of a central rest arm 51 with a heel 22 penetrating the ground or illustratively a known serrated rest plate 52. A central bracket 50 is affixed to the chassis 10 between the stepping legs and receives the rest arm 51 equipped with the rest plate 52, said arm 51 being secured to the bracket 50 by a plug-on means. As shown by FIGS. 7, 8, the rest arm 51 bears an approximately vertical steering shaft 56 for a pair of rest wheels 55 illustratively driven by a hydraulic engine 59. In the embodiment of FIG. 9, the plug-on arm inserted into the bracket 50 may be equipped with only one pair of braking rest wheels 55, provided steering takes place on even terrain by means of steered ground wheels 20.

When as shown by FIG. 6 the lateral pivot arms 23 comprise heels 22, the desired chassis stability is achieved by the height-adjustment of the pivot arms 23 provided by the actuators 24. When there is a single middle rest, this terrain matching will not be required.

Figure 8A:
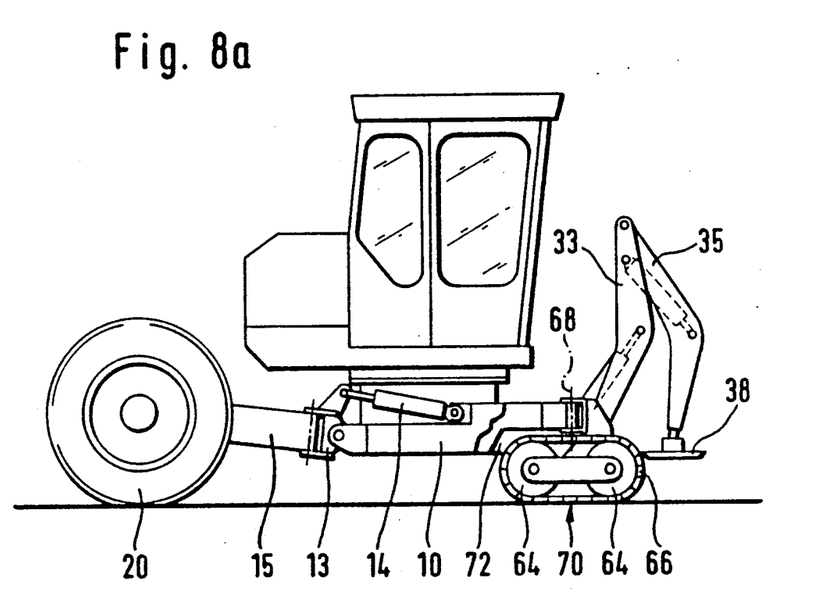
FIG. 8a is a variation of the vehicle of FIG. 8.

As shown by FIG. 8a, the support means is a track system 70 between the stepping legs with a design essentially the same in principle as shown in FIG. 7, said track being connected to a vertical guide shaft 68 supported in the chassis 10. Similarly to the pair of rest wheels of FIG. 7, a pair of track systems may be provided symmetrically to the center longitudinal axis, each track system consisting of one or two drive or reversing wheels 64 with a steel track chain 66 with rubber cleats passing over them, or with a metal-reinforced rubber chain. The track system can be controlled by means of an omitted actuator driving the guide shaft 68 and during operation on the terrain serves as an especially effective rest if turned by 90° to one side so as to be transverse. The chassis 10 partly shown in section in FIG. 8a may also comprise a lower clear space 72 matched to the play needed for the motion of the track.

The upper limbs 33 of the stepping legs always are supported at an articulation 31 about a horizontal axis 30 and the articulation 31 in turn is pivotable to the side at the chassis 10 about a vertical axis 31a, and for the illustration of FIG. 6, an angle of about 45°–60° will be covered using a side-pivoting actuator 32 between the straight ahead end position and the side end position. The actuators 34, 36 raising and lowering the upper limb and the lower limb are shown in FIGS. 1 and 4.

The bending and extending stepping legs 25, 26 operate synchronously in the manner shown in FIGS. 1 through 4 when the two leg articulations 31 are moved into their positions parallel to the direction of travel and determined by their end stops.

Figure 1:
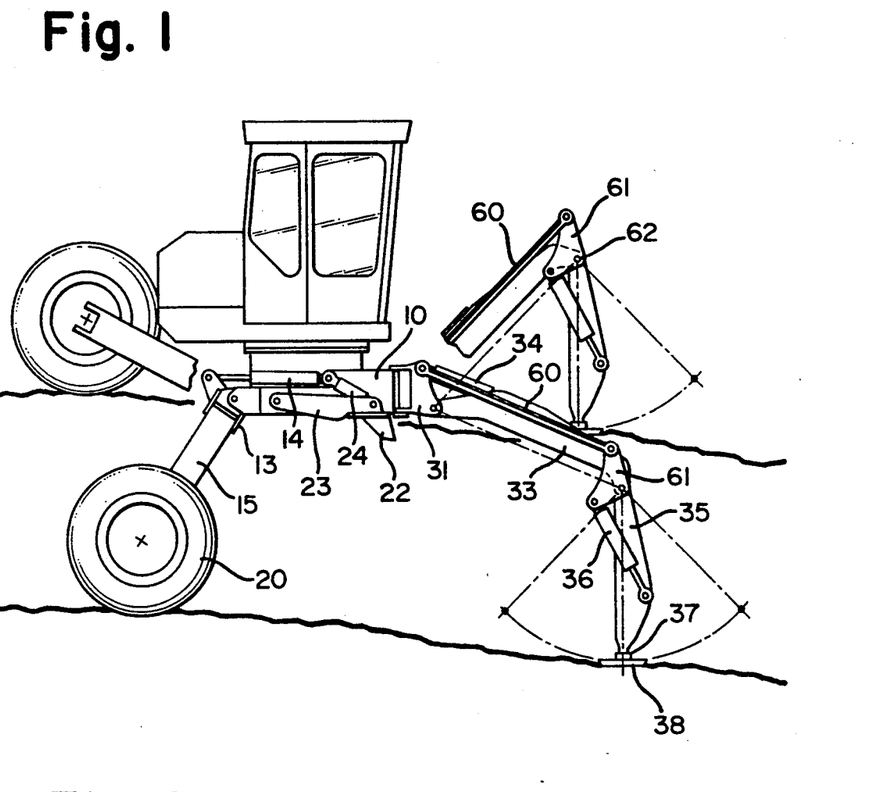
FIG. 1 is a sideview of a stepping vehicle of the invention of which the chassis is supported on two rests.
Figure 2:
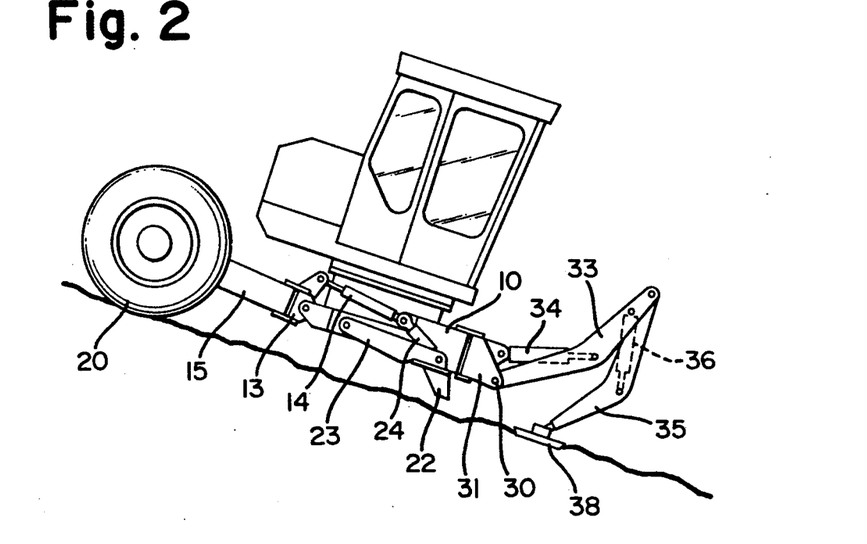
FIG. 2 is the vehicle of FIG. 1 of which the stepping legs resting on the ground raise the chassis off the ground.
Figure 3:
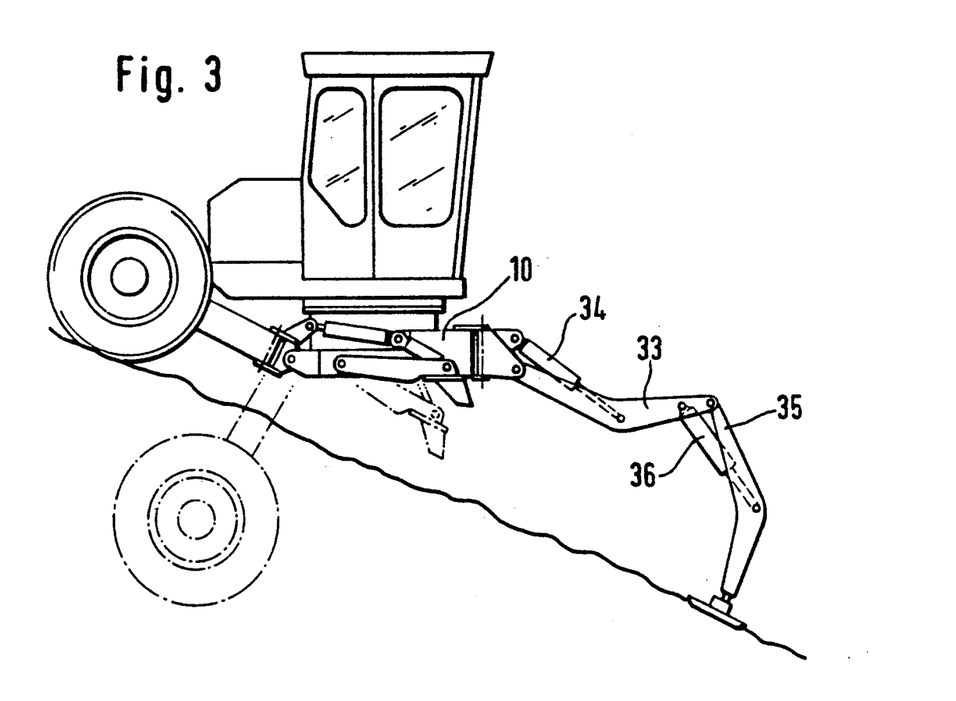
FIG. 3 is the vehicle of FIG. 2 with the stepping legs in their half-extended conditions.

When operating in the stepping mode, the upper limbs 33 are forced down in a first operation from the raised position shown in FIG. 1, whereby the chassis is raised as shown in FIG. 2 and the heels 22 are lifted off the ground. In a second operation the upper limbs 33 are forced down and the lower limbs 35 simultaneously are extended until the case illustrated by FIG. 3 is reached. The indicated second wheel arm with the lower ground wheel elucidates stepping on very rough terrain where the chassis is held horizontal by controlling the height pivotability of the wheel arms. In a third operation the extension of the lower limbs 35 from their position shown in FIG. 3 as far as the end position of FIG. 4 can be carried out, whereby the support is achieved by the middle rest arm 51 with rest plate 52. When the middle rest of the heel touches the ground, the wheel brakes may be locked automatically. During the rest position secured for the chassis on three or four points, the upper limbs 33 may be raised and simultaneously the lower limbs may be collapsed.

FIG. 6 shows the operational sequence when the chassis 10 changes direction. The initial position is assumed to be the end of the stepping cycle of FIG. 4. Both stepping legs 25, 26 are raised until the wheels 20 and the heels 22 hold the chassis. Thereupon the stepping leg 25—in the direction of which the direction of travel of the vehicle must be changed—is pivoted by the angle $\alpha$ into its second end position while the stepping leg 26 remains in the first end position parallel to the vehicle axis. Next both legs are pressed on the ground until the heels 22 are clear off it. By controlling the lateral pivoting actuators 32, the extended leg 25 is pivoted into the straight-ahead position shown by broken lines and the other leg 26 is pivoted outward. As shown by FIG. 6, the points A-B-C-D migrate correspondingly to A'-B'-C'-D'. As a result, a large support rectangle is preserved during this steering procedure and thereby high security against tipping over is achieved. Because wheel-steering is not required for this change in direction, invariant parallelogram steering means 28 are linked in FIG. 6 besides the wheel arms 15 to the articulations 13 and to the axle steering means 19, so that the ground wheels remain parallel to the vehicle axis.

As shown by FIG. 7, the vehicle is present on the terrain where the braked and steered pair of support wheels 55 serves as support between the stepping cycles. During road travel according to FIG. 8, all wheels and selectively the larger and/or smaller wheels are powered by hydraulic wheel-hub engines 59.

In order to steer the vehicle when on terrains, the ground wheels 20 are moved as shown by FIG. 9 into the turning-position into either direction by controlling in opposite directions the wheel-steering actuators 17a, 17b of the two wheel arms. When during this steering turn the stepping legs 25, 26 are extended, the vehicle moves over an arc of circle, the extended and parallel stepping legs participating in this motion on account of the hinging foot plates resting on the ground until that stepping leg which is on the side with the shorter arc has reached its extended end position.

Figure 10:
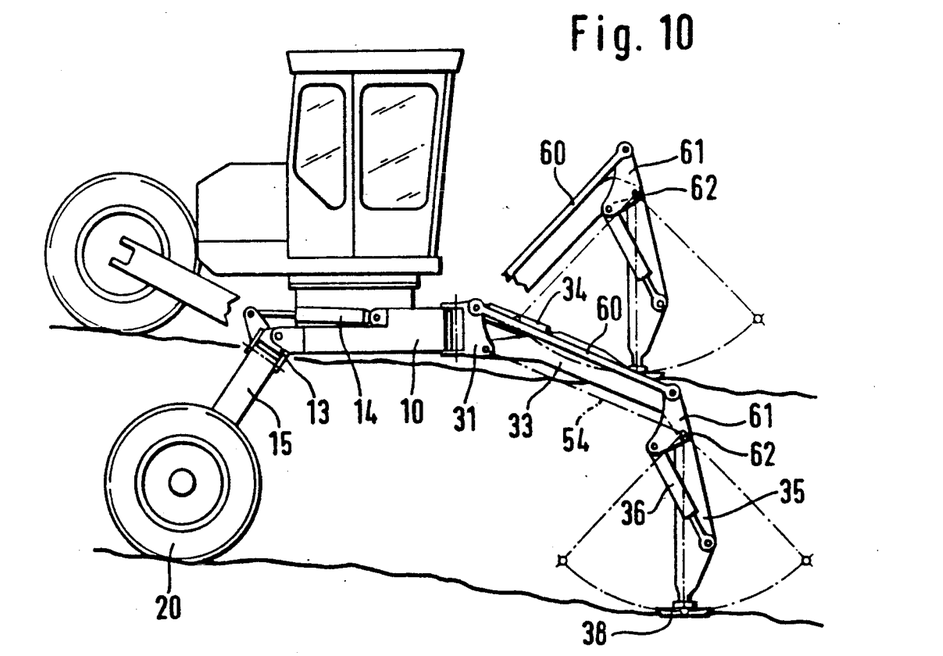
FIG. 10 is a sideview of a stepping vehicle moving along an escarpment and of which the stepping legs comprise limbs guided parallel to each other.

As shown by FIG. 10, the lower limbs 35 of the stepping legs are guided parallel at the upper limbs 33. If as shown the stepping vehicle—of which the support system has been omitted for clarity—moves along a terrain escarpment while the ground wheels 20 move at different terrain heights, then the advantages of the lower limbs being guided in parallel manner are especially clear. One or more guide bars 60 are linked to connection eyes of the leg articulation 31 on one or both sides of the upper-limb actuator 34 and are connected at the other end with an articulating means 61 in the form of a two-arm lever. The articulating means 61 hinges to crossbeam 62 at the outer, bent-off end of the upper limb 33, said crossbeam 62 being on a connecting line 54, shown in dashes and parallel to the guide bar 60, leading to the leg articulation 31. In view of these relationships illustrates in FIG. 10, the articulating means 61 retains the same position for all oblique positions of the upper limb 33. A lower-limb actuator 36 hinging at the other end of the articulating means 61 serves to adjust the lower limb 35 which is linked by the shaft 62 to the upper limb 33. The maximum adjustment angle of the lower limb is illustrated in broken lines in FIG. 10.

Advantageously the operation of the lower-limb actuator 36 is entirely independent of the position of the upper limb 33. In the example of FIG. 10, the actuator length extended to half its stroke correspons to an average and approximately vertical lower-limb position from which, by retraction or extension of the actuator 36, the lower limb 35 shall be always bent by the same angle and hence be extended by the same length. Hence, by keeping parallel the lower limbs 35, the stepping motions and the forces generated thereby can be controlled in especially obvious manner.

If keeping the lower limbs 35 parallel, even when on uneven terrain, the force and speed relations shall remain approximately constant, and therefore the driver can control his vehicle in obvious and easily calculated manner.

I claim:

1. A stepping vehicle with a chassis having mounted thereupon a superstructure carrying a working implement, with two wheel arms starting from one end of said chassis and bearing height-adjustable wheels and two stepping legs connected to the other chassis end for the purpose of forward and backward stepping motions and each leg having an upper limb pivotable up and down and side to side relative to the chassis, and each leg further having a lower limb pivotable up and down relative to the upper limb, said stepping vehicle comprising:
   a) said chassis includes a height-adjustable support means for supporting said chassis during individual stepping motions and during simultaneous stepping motions of the stepping legs; and,
   b) said stepping legs each having an independently adjustable lower limb and upper limb, said lower limb is linked by a parallel guiding mechanism to said upper limb.

2. The stepping vehicle as set forth in claim 1, wherein:
   a) each of said stepping legs are pivotable laterally from an end position parallel to a longitudinal axis of said vehicle to an angled position relative to said longitudinal axis; and,
   b) whereby when it is desired to change direction of said vehicle, one stepping leg is pivoted into a desired direction and the other stepping leg is pivoted into its ends position parallel to said longitudinal axis, so that when the chassis is raised by simultaneously extending said stepping legs, said chassis is moved into the new direction.

3. The stepping vehicle as set forth ion claim 1, wherein:
   a) said chassis includes extensible and collapsible heel means for supporting said chassis in a stable manner.

4. The stepping vehicle as set forth in claim 1, wherein:
   a) said collapsible heel means includes a central rest arm having a lower foot plate mounted centrally to said chassis.

5. The stepping vehicle as set forth in claim 4, wherein:
   a) said central rest arm is pivotable and height-adjustable.

6. The stepping vehicle as set forth in claim 3, wherein:
   a) said extensible and collapsible heel means includes a rest wheel.

7. The stepping vehicle as set forth in claim 6, wherein:
   a) said rest wheels can be adjusted by a vertical steering shaft.

8. The stepping vehicle as set forth in claim 1, wherein:
   a) said support means includes a track system mounted to said chassis.

9. The stepping vehicle as set forth in claim 8, wherein:
   a) said track system can be adjusted by a vertical steering shaft.

10. A stepping vehicle as set forth in claim 1, wherein:
    a) said chassis includes a bracket means for removably receiving said support means.

11. The stepping vehicle as set forth in claim 1, wherein:
   a) an articulation means is linked to an end of each upper limb and is guided by one or more guide rods located parallel to said upper limb,
   b) said lower limb is hingedly connected to said articulation means; and,
   c) an actuator for powering said lower limb is also hingedly connected to said articultion means.

* * * * *